US012059798B2

(12) United States Patent
Trombi

(10) Patent No.: US 12,059,798 B2
(45) Date of Patent: Aug. 13, 2024

(54) PAINT POT PRO

(71) Applicant: Marta Woolford, Berwick (AU)

(72) Inventor: Vincenzo Trombi, Melbourne (AU)

(73) Assignee: Marta Woolford, Berwick (AU)

( * ) Notice: Subject to any disclaimer, the term of this patent is extended or adjusted under 35 U.S.C. 154(b) by 77 days.

(21) Appl. No.: 17/250,635

(22) PCT Filed: Jan. 25, 2019

(86) PCT No.: PCT/IB2019/050617
§ 371 (c)(1),
(2) Date: Feb. 13, 2021

(87) PCT Pub. No.: WO2020/039266
PCT Pub. Date: Feb. 27, 2020

(65) Prior Publication Data

US 2021/0308857 A1 Oct. 7, 2021

(30) Foreign Application Priority Data

Aug. 20, 2018 (AU) ................................ 2018219987

(51) Int. Cl.
*B25G 3/12* (2006.01)
*A45F 5/02* (2006.01)
(Continued)

(52) U.S. Cl.
CPC ................ *B25G 3/12* (2013.01); *A45F 5/021* (2013.01); *A46B 17/02* (2013.01); *A46B 17/06* (2013.01);
(Continued)

(58) Field of Classification Search
CPC .......... B25G 3/12; B25G 1/102; B44D 3/121; B44D 3/126; B44D 3/128; B44D 3/164;
(Continued)

(56) References Cited

U.S. PATENT DOCUMENTS 5,251,352 A * 10/1993 Cullison .................. B25F 1/04 30/169
6,494,417 B1 * 12/2002 Gizzi .................... A46B 17/02 248/113

(Continued)

FOREIGN PATENT DOCUMENTS

WO WO-2013134792 A1 * 9/2013 ............... B25F 1/00
WO WO 2018136928 A1 7/2018

OTHER PUBLICATIONS

Australian Patent Application No. 2018219987, first Examination Report dated Nov. 23, 2021, 4 pages.

(Continued)

*Primary Examiner* — Robert J Hicks
(74) *Attorney, Agent, or Firm* — Cozen O'Connor

(57) ABSTRACT

A paint-pot/kettle includes a manually detachable/attachable multi-use tool-handle. The paint-pot/kettle holds substances, such as paint, for the use with a brush and/or mini-roller. The paint-pot/kettle includes: angled/magnetized brush-rest, wiping-blade, mini-roller-glide, mini-roller-holder, belt-clip/loops, removable/replaceable plastic pot-liners to line the internal of the paint-pot/kettle, ergonomically-designed plastic handle (referred to as the multi-use tool-handle), and male component of the manual-locking system to attach/detach the multi-use tool-handle from the paint-pot/kettle. The multi-use tool-handle has multi-use functions including: mallet to close paint tins, paint tin openers, mini-roller cleaning-aid, shark-tooth brush cleaning-aid, scraping blade, beer bottle opener, female component of the female-to-male locking-system designed to attach the multi-use tool-handle to pot/kettle.

8 Claims, 10 Drawing Sheets

Figure 1:
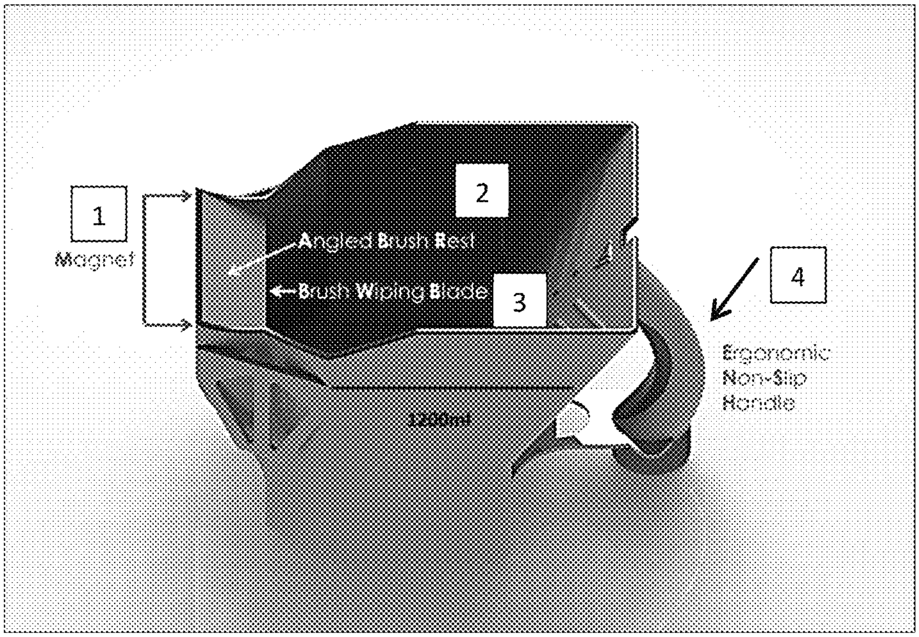

(51) Int. Cl.

| | |
|---|---|
| ***A46B 17/02*** | (2006.01) |
| ***A46B 17/06*** | (2006.01) |
| ***B25D 1/12*** | (2006.01) |
| ***B25G 1/10*** | (2006.01) |
| ***B44D 3/12*** | (2006.01) |
| ***B44D 3/16*** | (2006.01) |
| ***B44D 3/24*** | (2006.01) |
| ***B65D 25/28*** | (2006.01) |
| ***B67B 7/14*** | (2006.01) |
| ***B67B 7/16*** | (2006.01) |
| ***B67B 7/44*** | (2006.01) |

(52) U.S. Cl.
CPC ............... *B25D 1/12* (2013.01); *B25G 1/102* (2013.01); *B44D 3/121* (2013.01); *B44D 3/126* (2013.01); *B44D 3/128* (2013.01); *B44D 3/164* (2013.01); *B44D 3/24* (2013.01); *B65D 25/28* (2013.01); *B67B 7/14* (2013.01); *B67B 7/16* (2013.01); *B67B 7/44* (2013.01); *A46B 2200/202* (2013.01); *B65D 2525/285* (2013.01)

(58) Field of Classification Search
CPC ......... B44D 3/162; B65D 25/28; A45F 5/021; A45F 5/02; A46B 17/02; A46B 17/06; B25D 1/12; B67B 7/14; B67B 7/16; B67B 7/44
USPC ..... 220/570, 495.02, 495.01, 698, 696, 695, 220/697, 763, 762, 756; 81/3.15, 3.09; 7/105, 151
See application file for complete search history.

(56) References Cited

U.S. PATENT DOCUMENTS

| | | | | |
|---|---|---|---|---|
| 6,640,369 | B1 * | 11/2003 | Malvasio ............... | B44D 3/128 7/105 |
| 8,887,940 | B2 * | 11/2014 | Kiceniuk, Jr. ......... | B44D 3/121 248/339 |
| 2006/0071010 | A1 | 4/2006 | Byrne | |
| 2006/0201951 | A1 * | 9/2006 | Cingel ................... | B44D 3/125 220/570 |
| 2007/0295768 | A1 | 12/2007 | Gringer et al. | |
| 2008/0251525 | A1 | 10/2008 | Fontaine et al. | |
| 2011/0259891 | A1 | 10/2011 | Thibault | |
| 2012/0037634 | A1 | 2/2012 | Kiceniuk, Jr. et al. | |

OTHER PUBLICATIONS

Australian Patent Application No. 2018219987, second Examination Report dated Dec. 8, 2021, 5 pages.
PCT/IB2019/050617, International Preliminary Report on Patentability dated Oct. 30, 2020, 4 pages.

* cited by examiner

PAINT POT PRO

For many years painters have wasted time and energy searching for their misplaced tools required for their painting jobs. Furthermore, painters also face the challenge of abiding to the safe three points of contact rule (which is two hands and one foot or two feet and one hand on the ladder at all times). An all in one solution to the above problems has been achieved by the present novel invention. The invention named Paint Pot Pro incorporates a multi-faceted paint pot/kettle unit together with a multi-use utility tool, handle that can be detached and attached manually from the paint pot/kettle, is a novel and unique all in one painter's aid for painters and DIY enthusiasts.

A number of the components/tools of the Paint Pot Pro are available on the market, sold as individual items. However, there is no one product on the market that combines all the components/tools of the Paint Pot Pro together in one product/unit. Nor is there any paint pot/kettle product of which its handle can be manually detached and attached, enabling its function to be transformed from a handle to an independent multi-use utility tool (also referred to as the 'tool handle'), as the Paint Pot Pro provides.

The Paint Pot Pro comprises the following: (1) a paint pot/kettle, for paint/stain/varnish brush and roller use, that has multiple functions; and (2) a manually detachable/attachable multi-use utility 'tool handle'. Each of the features of the Paint Pot Pro are described individually in detail in paragraphs 0004 to 00012. (Refer to illustrations FIGS. 1 to 15).

The paint pot/kettle component of the Paint Pot Pro holds paint/stain/fvarnish for the use of brush and roller and comprises of an approximate volume-capacity up to 2 litres (2,000 millilitres). The paint pot/kettle is made from materials such as (but not limited to) plastic suitable for dispensing of paints, such as (but not limited to) acrylic and enamel; as well as stains such as (but not limited to) diacetone alcohol and trivalent organic chromates (refer to illustrations FIGS. 1,2,15).

The paint pot/kettle component of the Paint Pot Pro is designed with an angled magnetised 'brush-rest' where the magnet may or may not be concealed). The magnet component of the 'brush-rest' allows excess paint/stain/varnish to drip/flow back into the pot/kettle. The combined functions of the 'brush-rest' magnets and angle prevent the brush being submerged into the paint/stain/varnish. The 'brush-rest' also acts as a wiping blade/edge to remove excess paint from the brush and back into the pot (refer to illustration FIG. 1: Label 1,2,3; and FIG. 15).

The paint pot/kettle component of the Paint Pot Pro incorporates a a roller with grooves that is positioned opposite the 'brush-rest' (described in paragraph 0005). The purpose of the roller glide is to cover and spread the paint/stain/varnish across the roller (refer to illustration FIG. 2: Label 5).

Figure 2:
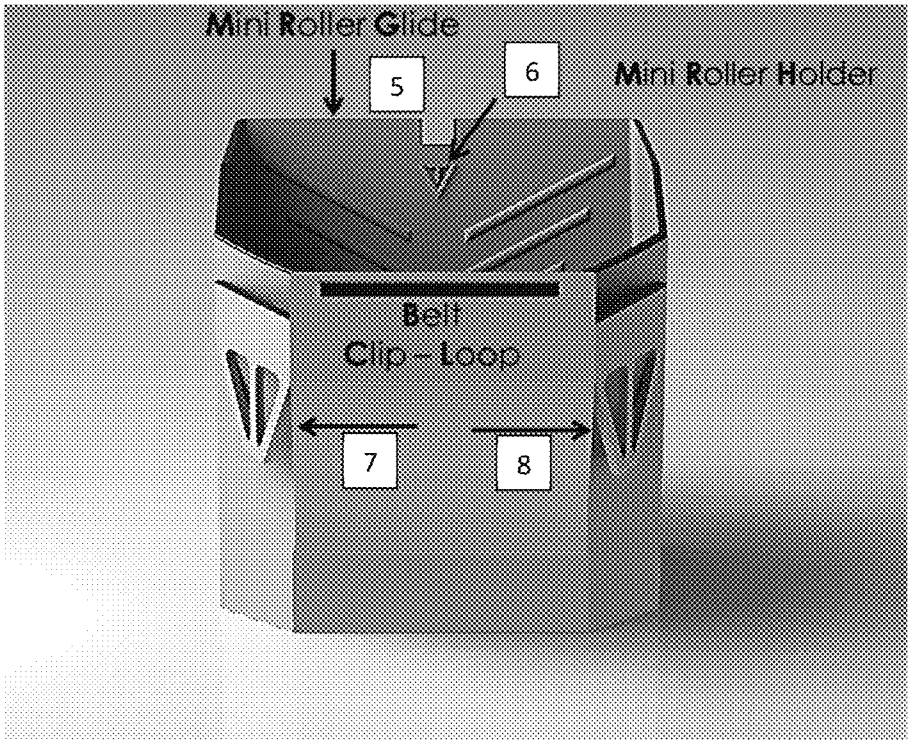
Figure 3:
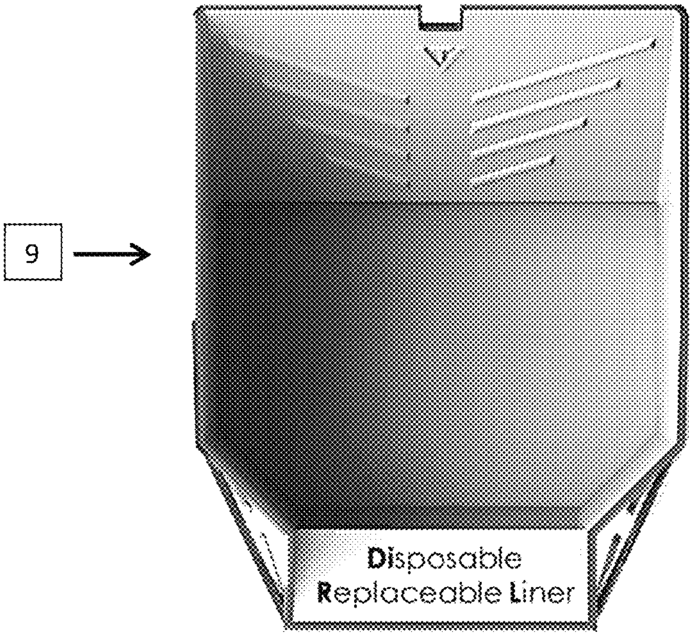
Figure 4:
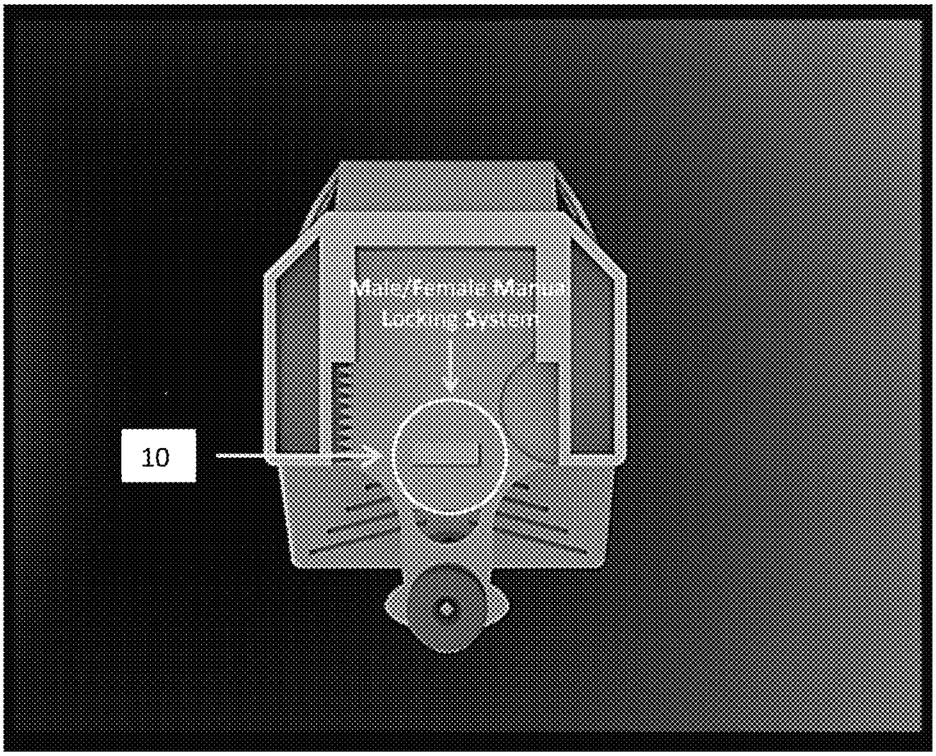
Figure 5:
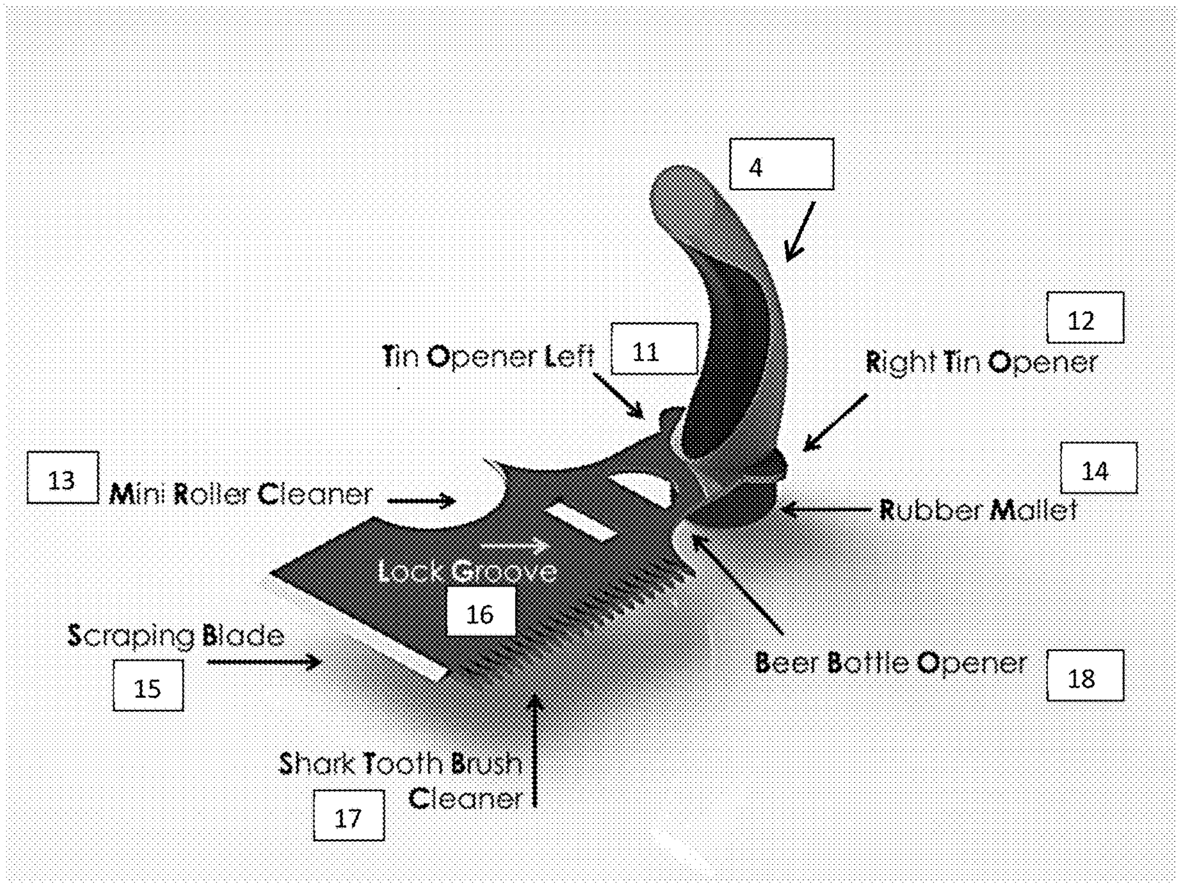
Figure 6:
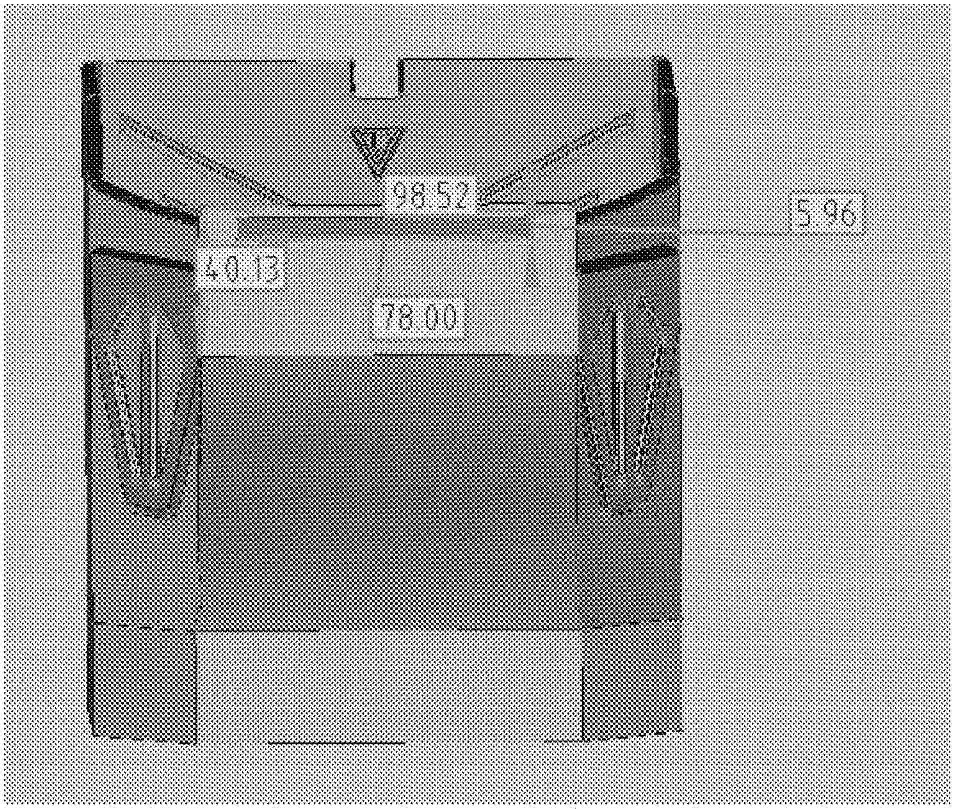
Figure 7:
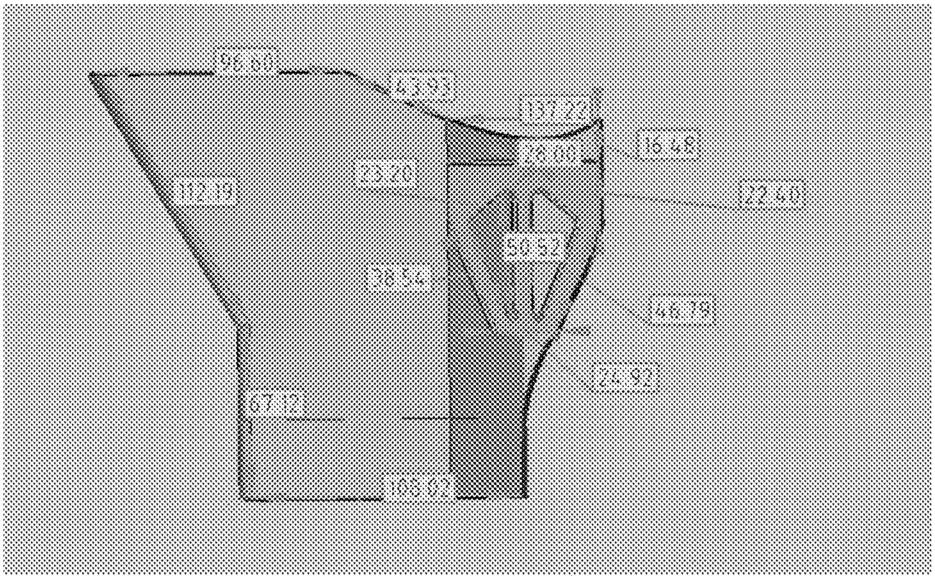
Figure 8:
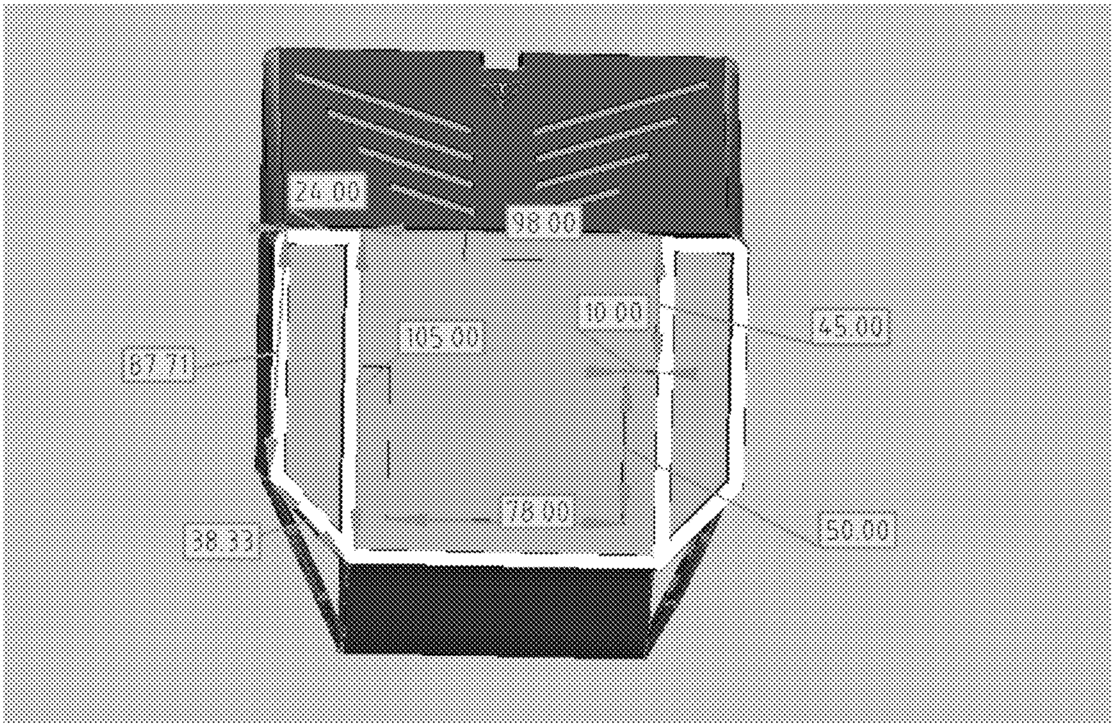
Figure 9:
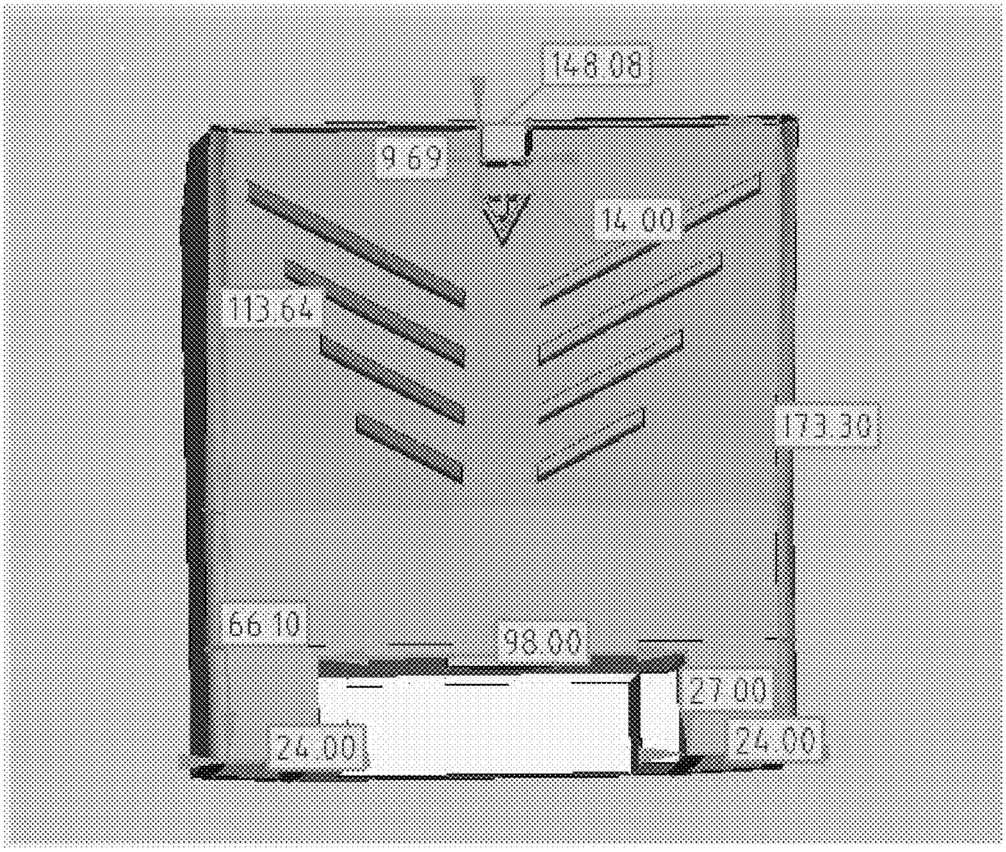
Figure 10:
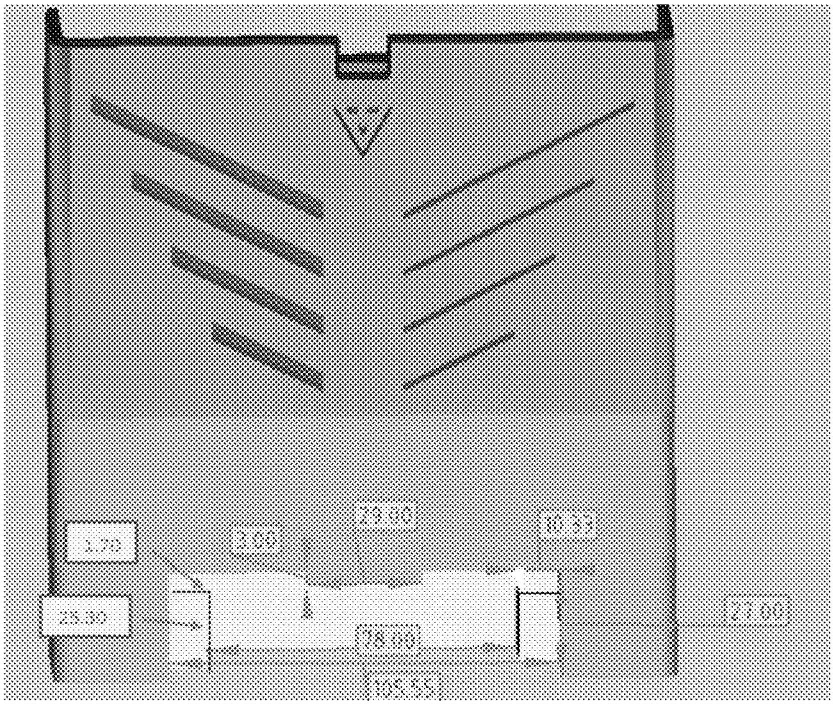

The paint pot/kettle component of the Paint Pot Pro has one or two roller holders that are positioned above the roller glide (refer to illustration FIG. 2: Label 6).

The paint pot/kettle component of the Paint Pot Pro has two belt-clip/loops (one positioned to the left and one positioned to the right of the paint pot/kettle) (refer to illustration FIG. 2: Label 7,8; and FIG. 15). The belt-clip/loops can be used in one of two ways. Either to be pushed down or clipped onto the belt as in compression fit or thread belt through loop before fastening to a waist or ladder. These two functions of the belt-clip/loops can be used when the tool handle (described in paragraphs 0001, 0002 and 00010) is attached and detached from the paint pot/kettle. The functions of the belt-clip/loops conform to the three points of contact rule during ladder use (described above in paragraph number 0001).

Removable and replaceable plastic pot liners to line the internal of the paint pot/kettle, is a feature of the Paint Pot Pro that allows the user to alternate paint/stain/varnish colours, and minimise washing by disposing of the liner when paint jobs are complete. The plastic pot liner is made from plastic suitable for dispensing of paints, such as (but not limited to) acrylic and enamel; as well as stains such as (but not limited to) diacetone alcohol and trivalent organic chromates (refer to illustration FIG. 3: Label 9). With plastic pot liners in place, the functions of the paint pot/kettle (described in paragraphs 0004 to 0008) are maintained. The plastic pot liners do not need to be in place for the features of the paint pot/kettle to be maintained.

Figure 11:
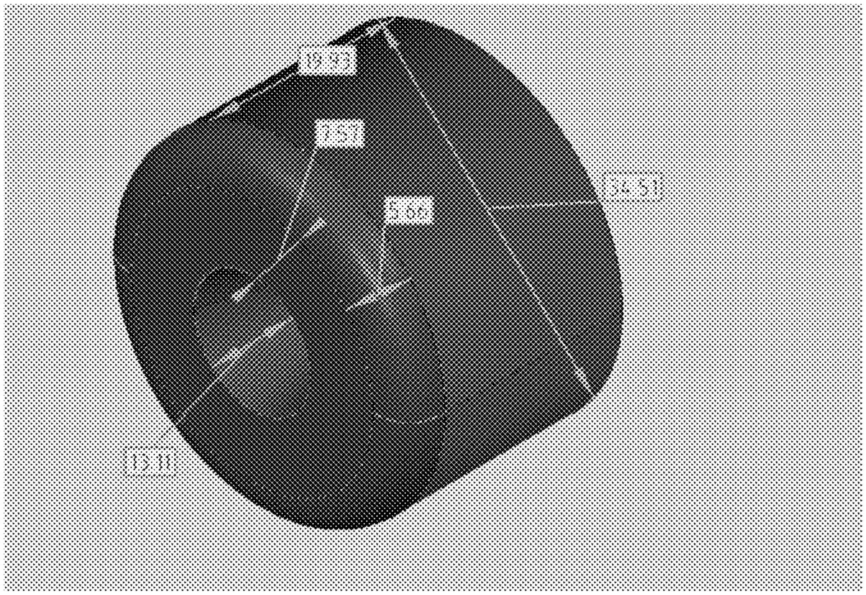
Figure 12:
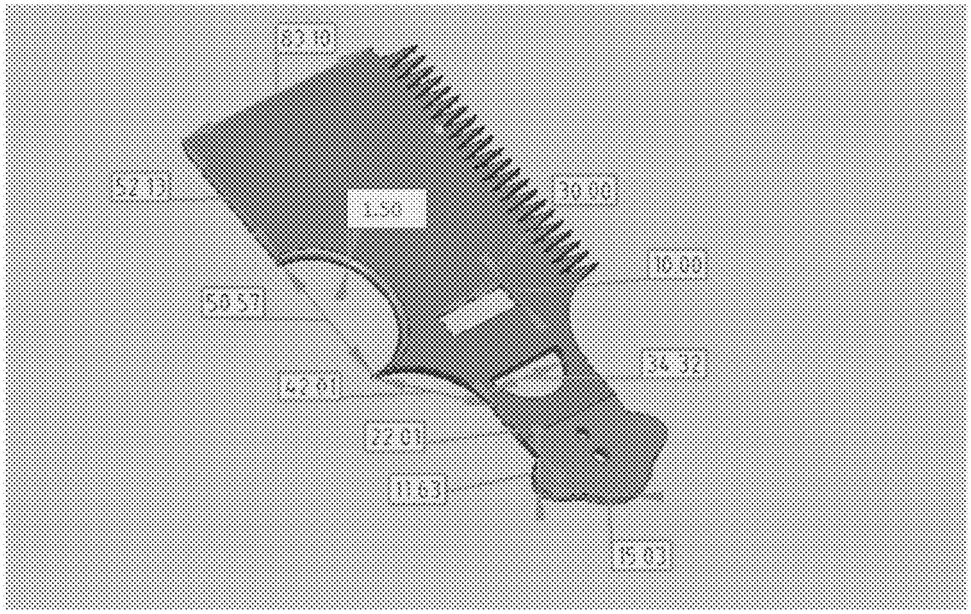
Figure 13:
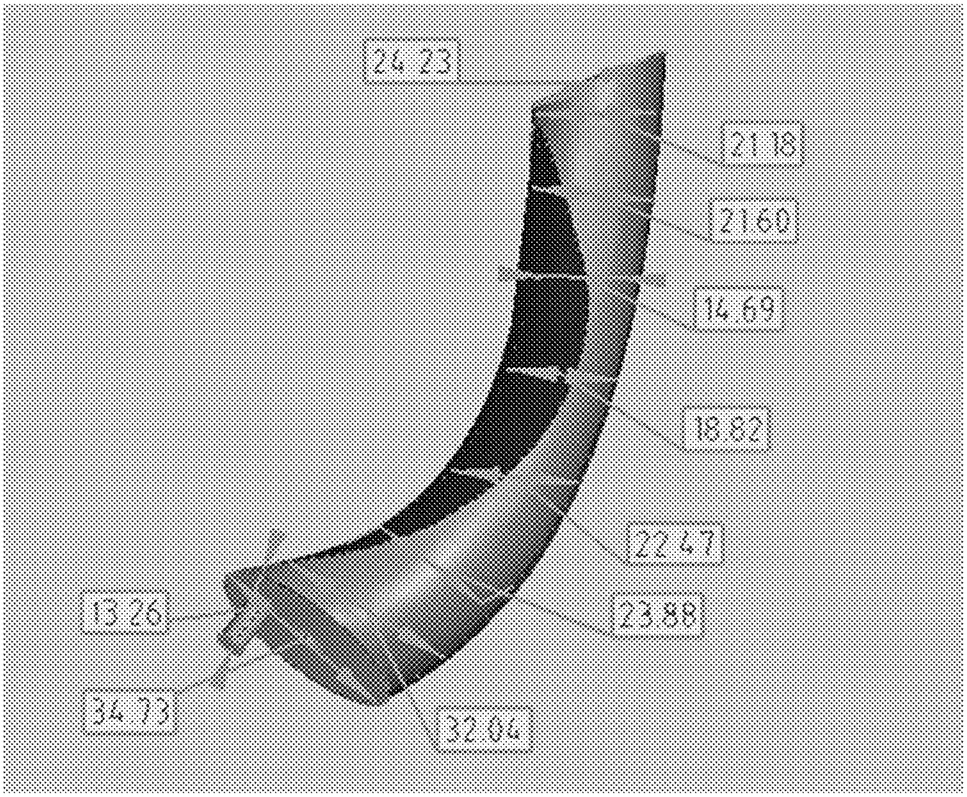
Figure 14:
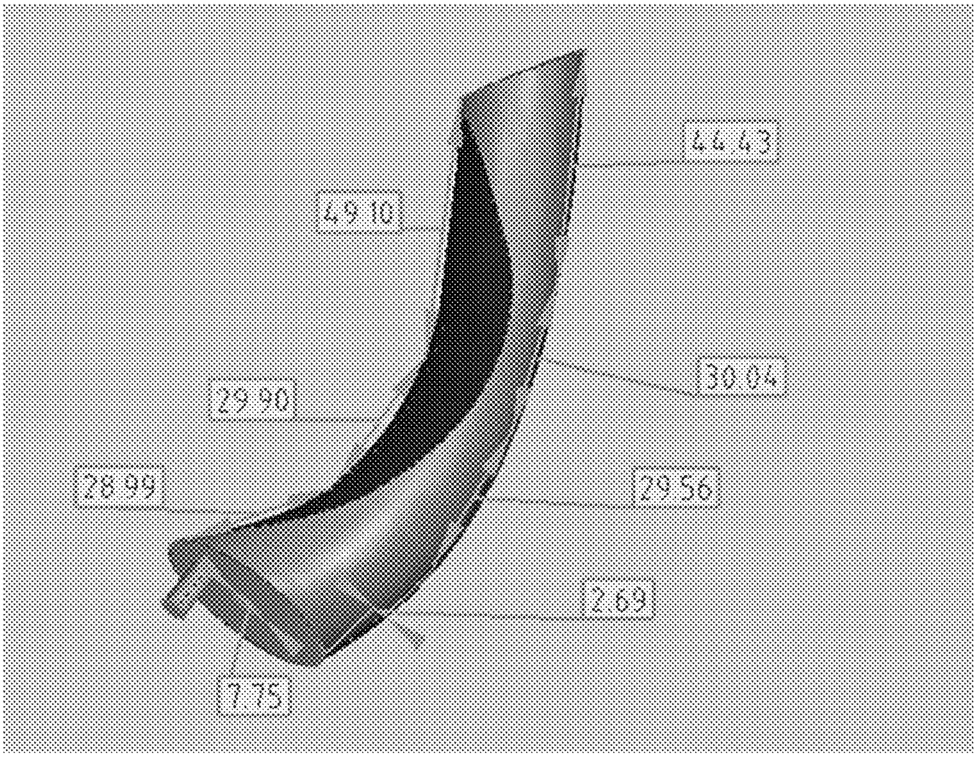
Figure 15:
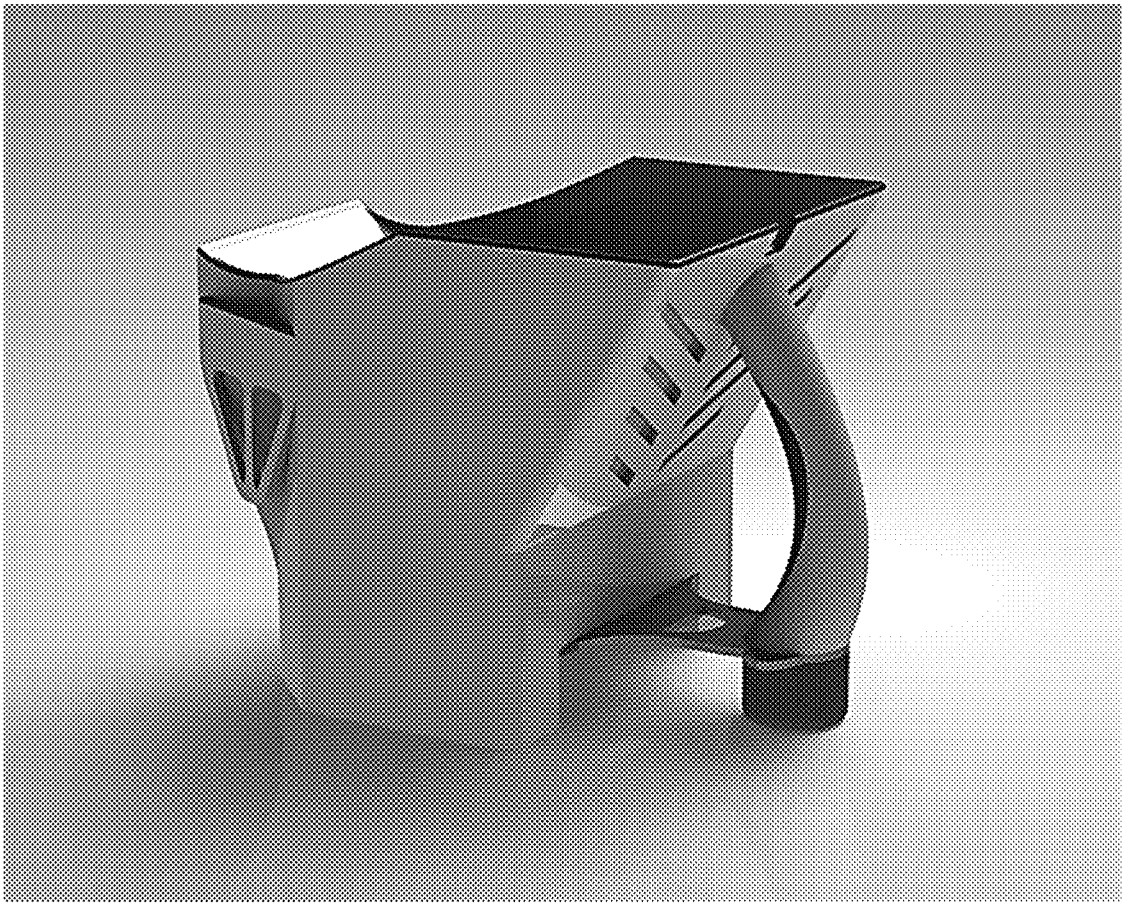

The handle of the Paint Pot Pro is novel as it has two unique functions, including: (1) when attached to the paint pot/kettle, the handle of the Paint Pot Pro functions as a handle for the pot/kettle (refer to illustration FIG. 1: Label 4; and FIG. 15); and (2) when detached from the paint pot/kettle, the handle becomes a handle to the multi-use/utility tool, referred to as the tool handle (refer to illustration FIG. 5: Label 4). The tool handle has multi-use/utility functions (refer to illustration FIG. 5) including: (a) A mallet made from suitable rubber (such as TPR) to close paint tins (Label 14: FIG. 11); (b) two paint tin openers located towards the bottom left and bottom right sides of the tool handle, made from suitable material such as steel or plastic (Label 11,12); (c) semi-circle roller cleaning aid made from suitable material such as settle or plastic to assist scrapping away fresh and/or drying (not dried) paint/stain/varnish from the roller during cleaning (Label 13); (d) shark-tooth paint brush cleaning aid made from suitable material such as steel or plastic to assist in scraping away fresh and/or drying (not dried) paint/stain/varnish from the outside of the paint brush to assist during cleaning (Label 17); (e) scraping blade made from suitable material such as steel or plastic to remove loose or flaky old paint/stain/varnish from suitable surfaces, such as timber (Label 15); (f) beer bottle opener made from suitable material such as steel or plastic to open Crown Beer Bottle Caps (Label 18); (g) stainless steel female component (groove) of the male-to-female locking system made from suitable material such as steel or plastic to attach the tool-handle to the pot/kettle (refer to illustration FIG. 5 Label 16; and Illustration FIG. 4 Label 10; and Paragraph number 00011 for a detailed description).

A novel feature of the Paint Pot Pro is the manual locking system to attach and detach the tool handle to/from the paint pot/kettle. The primary function of the manual locking system is to securely attach the tool handle to the paint pot/kettle, preventing the tool handle from unnecessarily detaching from the paint pot/kettle during use. The manual locking system is preferably made applying a female-to-male locking system design (refer to illustration FIG. 4: Label 10); however other manual locking systems may also be used. While other locations may be considered, the preferred location of the manual locking system is underneath the paint pot/kettle as this ensures even weight distribution, balance and prevents the tool handle from detaching from the pot/kettle during use.

The dimensions of the Paint Pot Pro are presented in FIGS. 6 to 14. For front of the Paint Pot Pro dimensions, refer to FIG. 6. For side of the Paint Pot Pro dimensions, refer to FIG. 7. For underside of the 'Paint Pot Pro' dimensions, refer to FIG. 8. For back/tool handle side of the Paint Pot Pro dimensions, refer to FIGS. 9 and 10. For female-to-male locking system of the 'Paint Pot Pro' dimensions, refer to FIG. 10. For mallet of the Paint Pot Pro dimensions, refer to FIG. 11. For multi-use detachable utility tool handle of the Paint Pot Pro dimensions, refer to FIG. 12. For tool handle grip of the 'Paint Pot Pro' dimensions, refer to FIGS. 13 and 14.

The dimensions of the Paint Pot Pro presented in FIGS. 6 to 14 are as close as possible to the final product. However, tolerances need to be acknowledged. The volume capacity and overall size of the Paint Pot Pro may increase or decrease. These changes in dimensions and volume do not alter the features of the Paint Pot Pro, including the features of the paint pot/kettle and the multi-use detachable/attachable utility tool handle.

The invention claimed is:

1. A paint pot/kettle with a multi-use detachable/attachable tool handle for holding substances comprising of:

a paint pot/kettle, for brush and roller use, which is comprised of:

an ergonomic tool handle;

an angled magnetized brush rest;

a wiping blade/edge;

a left and right side of pot/kettle belt clip/loops;

a roller glide;

a roller rest/holder;

a male component of a female-to-male manual locking system that connects the pot/kettle to the multi-use detachable/attachable tool handle; and a multi-use detachable/attachable tool handle, that manually locks into the paint pot/kettle which comprises of:

a shark tooth paint brush cleaning aid;

a semi-circle roller cleaning aid;

a scraping blade;

a rubber mallet tin closer;

two paint tin openers;

a crown beer bottle opener; and a female component of the female-to-male manual locking system, that connects the multi-use detachable/attachable tool handle to the paint pot/kettle.

2. The paint pot/kettle with a multi-use detachable/attachable tool handle, as claimed in claim 1, further comprising:

a removable and replaceable plastic pot liner which holds liquids.

3. The paint pot/kettle with a multi-use detachable/attachable tool handle, as claimed in claim 1, wherein the angled magnetized brush rest further comprises of:

an angled magnet on which a brush can rest both during use as well as when not in use; and wherein further:

the angle of the angled magnetized brush rest allows brush bristles to rest over the contents of the paint pot/kettle thus allowing any excess residue to fall back into the paint pot/kettle;

the magnet on the angled magnetized brush rest prevents brush bristles from falling into the paint pot/kettle whilst the angle allows residue paint/stain/varnish to drip/flow back into the paint pot/kettle; and the edge of the angled magnetized brush rest can also be used as a wiping blade.

4. The paint pot/kettle with a multi-use detachable/attachable tool handle, as claimed in claim 1, wherein the left and right side of the paint pot/kettle belt clip/loops are positioned at the left and right side of the paint pot/kettle and wherein the left and right side of the paint pot/kettle belt clip/loops can be used in the following two ways:

first, as a compression fit in which the left and right side of the paint pot/kettle belt clip/loops are pushed down or clipped over the belt to the left or right side of a user's abdomen/waist/hips, depending on whether the user is left or right-handed; and/or second, for a user to thread a belt through the left and right side of the paint pot/kettle belt clip/loops before fastening to a user's abdomen/waist/hips or to a ladder.

5. The paint pot/kettle with a multi-use detachable/attachable tool handle, as claimed in claim 1, wherein the multi-use detachable/attachable tool handle can be used as a handle to carry/hold the paint pot/kettle; and wherein the multi-use detachable/attachable tool handle can be detached and attached from the paint pot/kettle via the manual locking system.

6. The paint pot/kettle with a multi-use detachable/attachable tool handle, as claimed in claim 1, wherein the multi-use detachable/attachable tool handle has the following two functions:

the first function: when attached, the multi-use detachable/attachable tool handle is used as the handle to the paint/pot kettle; and in addition, when the detachable/attachable tool handle is attached to the paint/pot kettle, the detachable/attachable tool handle also has the use of its crown beer bottle opener function; and/or the second function: the multi-use detachable/attachable tool handle can be detached via the manual locking system and used independently from the paint pot/kettle as a multi-use detachable/attachable tool handle.

7. The paint pot/kettle with a multi-use detachable/attachable tool handle, as claimed in claim 1, wherein the multi-use detachable/attachable tool handle when detached via the manual locking system is a multi-use detachable/attachable tool handle; and wherein further the multi-use detachable/attachable tool handle comprises of nine independent functions, including:

a mallet tin closer, made from suitable rubber, to close paint tins;

two paint tin openers, located towards the bottom left and bottom right sides of the multi-use detachable/attachable tool handle made from suitable material to open paint tins;

semi-circle roller cleaning aid, made from suitable material to assist scrapping away fresh, drying, and/or not dried substance from the roller during cleaning;

a shark-tooth paint brush cleaning aid made from suitable material to assist in scraping away fresh, drying, and/or not dried substancefrom the outside of the paint brush bristles during cleaning;

a scraping blade, made from suitable material such as steel or plastic to remove loose or flaky old substance from surfaces;

a crown beer bottle opener, made from suitable material to open crown beer bottle caps; and an opening as the female component of the female-to-male manual locking system made from suitable material, which is referred to as the manual locking system, to attach the multi-use detachable/attachable tool handle to the paint pot/kettle.

8. The paint pot/kettle with a multi-use detachable/attachable tool handle, as claimed in claim 1, wherein the female-to-male manual locking system detaches and attaches the paint pot/kettle and the multi-use detachable/attachable tool handle from and to each other; and wherein further:

the underside of the paint pot/kettle provides the male component within its plastic Mould for the female-to-male locking system;

the multi-use detachable/attachable tool handle provides for the female component of the female-to-male locking system; and the female-to-male locking system allows the female component of the multi-use detachable/attachable tool handle to slide into/out of the male component under the paint pot/kettle as guided by a channel underneath the paint pot/kettle, and thereby locking/unlocking the position.

* * * * *